US007171232B2

(12) United States Patent  
Atsumi et al.

(10) Patent No.: US 7,171,232 B2  
(45) Date of Patent: Jan. 30, 2007

(54) METHOD OF SELECTING A CELL TO CONNECT BY RADIO WITH A MOBILE STATION AND A MOBILE COMMUNICATIONS TERMINAL THEREFOR

(75) Inventors: Tsuyoshi Atsumi, Tokyo (JP); Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 110 days.

(21) Appl. No.: 11/011,081

(22) Filed: Dec. 15, 2004

(65) Prior Publication Data

US 2005/0170857 A1  Aug. 4, 2005

(30) Foreign Application Priority Data

Jan. 30, 2004  (JP) .............................. 2004-022720

(51) Int. Cl.  
*H04Q 7/20* (2006.01)

(52) U.S. Cl. ...................... 455/525; 455/513; 455/522

(58) Field of Classification Search ................ 455/445, 455/446, 450, 62, 513, 522, 517, 524, 525, 455/436–439; 370/294, 320, 350; 375/294, 375/304, 344, 350, 498  
See application file for complete search history.

(56) References Cited

U.S. PATENT DOCUMENTS 5,394,158 A * 2/1995 Chia .......................... 342/457

5,677,908 A * 10/1997 Oura .......................... 370/331  
5,924,034 A * 7/1999 Dupuy ....................... 455/440

FOREIGN PATENT DOCUMENTS

EP   1 069 794 A2   1/2001

* cited by examiner

*Primary Examiner*—George Eng  
*Assistant Examiner*—Sam Bhattacharya  
(74) *Attorney, Agent, or Firm*—Nixon Peabody LLP; Donald R. Studebaker

(57) ABSTRACT

A mobile communications system includes an RF processor for transmitting and receiving radio signals to and from a base station, and a base-band processor for spread-spectrum coding a frame signal to be transmitted to transfer it to the RF processor and spread-spectrum decoding a signal transferred from the RF processor to extract a frame signal. The base-band processor includes a rake receiver for demodulating the received signal and a cell selector and processor for selecting a cell to be connected based upon the propagation path and the power of the received signal. The cell selector and processor includes a search circuit for detecting a cell from the received signal, a cell operator for determining a cell from which received is a signal associated with a shorter propagation path, based on the reception timing of the received signal, and a connecting cell selector for selecting a cell to be connected.

6 Claims, 5 Drawing Sheets ced from the base station. In this way, since cell switching is carried out

METHOD OF SELECTING A CELL TO CONNECT BY RADIO WITH A MOBILE STATION AND A MOBILE COMMUNICATIONS TERMINAL THEREFOR

BACKGROUND OF THE INVENTION

1. Field of the Invention

The present invention relates to a method of selecting a cell formed by a base station to which a mobile station moving in a radio service area covered by cells is to be connected, and a mobile communications terminal for selecting a cell to communicate by radio with a base station.

2. Description of the Background Art

In recent years, a mobile communications system has been developed, in which communications including telephone or speech transmission are accomplished by using mobile telephones, such as PHS (Personal Handyphone System) and cellular phones. For example, in a digital mobile communications system employing an access scheme, such as a TDMA (Time Division Multiple Access) or a CDMA (Code Division Multiple Access), communications are established between base stations located in the service area and radio terminals serving as mobile stations, to thereby enable communications including telephone to be established between mobile stations or between a mobile station and other kinds of communications terminal.

In such a communications system, the entire service area is divided into a plurality of small radio zones called cells. The cells are formed by respective base stations to provide service to mobile stations positioned in a service area. In such a case, the base stations are disposed so as to have the respective cells thereof partially overlapped with each other to thereby establish a continuous service area. A mobile station will, when moving or carried into another cell during communication with a current base station, carry out handover for switching the cells and be able to continue, after switching, communication with a new base station forming the other cell. It is therefore necessary to provide the mobile station with a cell selecting function of selecting a cell to be switched when the station travels between cells in order to maintain good communication quality.

With the cell selecting function, for example, a cell associated with the strongest radio wave received is determined as a proper cell among the radio waves received from the base stations to communicate with the base station forming that cell to carry out process control, such as location registration to continue telephoning and communications. The mobile stations are thus adapted to monitor the level or intensity of signals received from the base station currently connected and from other base stations not in connection therewith to determine a base station that has transmitted the received signal which has its level highest among them, and then switch to a cell formed by that base station as a cell to which the mobile station will be connected, thus completing handover. Publication, EP 1 069 794 A2, for example, discloses a cell search control method for selecting the best base station for a mobile station.

Thus, conventionally, the electric power of the received signals was monitored to select a cell associated with the power of a received signal higher than others. With such conventional systems, for example, when an obstacle or the like is temporarily involved on a propagation path between the base and mobile stations to significantly attenuate the radio waves on the path, handover has to be made to another base station. In this way, since cell switching is carried out upon the power of a received signal temporary fluctuated, it was a problem that, even when a mobile station comes to a place where the propagation distance is shorter to the base station so as to sufficiently secure, but temporarily reduce, the electromagnetic field of a received signal, handover may excessively often occur for switching to another base station having its propagation distance longer than the current one and the field of the received signal temporarily stronger at a moment.

When such unnecessary handover takes place excessively, processing loads increase too much in the entire communications system, base stations and mobile stations, thus causing increase in electric power consumption, as was a drawback.

SUMMARY OF THE INVENTION

It is an object of the present invention to provide a cell selecting method capable of selecting an effective cell while preventing excessive handover, and a mobile communications terminal therefor.

According to the present invention, in a method of selecting a cell formed by a base station to which a mobile station travelable in a radio service area covered by a plurality of cells is to be connected, the reception timing of signals received by the mobile station is detected, a difference is calculated in reception timing between the signals received from any of the plurality of cells, a cell is determined from which the signal was received and with which a shorter propagation path is associated, based on the difference calculated to select the determined cell.

Further according to the present invention, a mobile communications terminal travelable in a radio service area covered by a plurality of cells formed by a corresponding plurality of base stations for selecting one of the plurality of cells which is formed by a base station to be connected includes a transmitter/receiver for transmitting and receiving a radio signal to and from any of the base stations; and a base-band processor for spread-spectrum coding a frame signal to be transmitted to deliver the coded frame signal to the transmitter/receiver, and spread-spectrum decoding the signal received by the transmitter/receiver to then extract the frame signal. The base-band processor includes a signal receiver for demodulating the received signal; and a cell selector for selecting a cell to be connected on the basis of a propagation path associated with the received signal and an electric power of the received signal.

According to the present invention, a mobile station is capable of detecting the reception timing of received signals, determining a cell associated with the received signal having a shorter propagation path based on the difference in reception timing of the signals, and selecting the determined cell. Also, a mobile communications terminal is capable of selecting a cell to be connected, based on the propagation path and the reception power of the received signal. It is therefore possible to continuously maintain communications over the current, shorter path, for example, even when the reception level of the signals become temporarily lower in the cell, without temporarily switching to another cell so far as communications are possible over the current, shorter path, thereby suppressing excessive handover to a cell associated with a signal received which has a temporarily higher reception level. As the result, the processing load can be reduced. For example, in a mobile station and a mobile communications system, surplus processing can be reduced, which, for example, enables electric consumption to reduce as well.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 2:
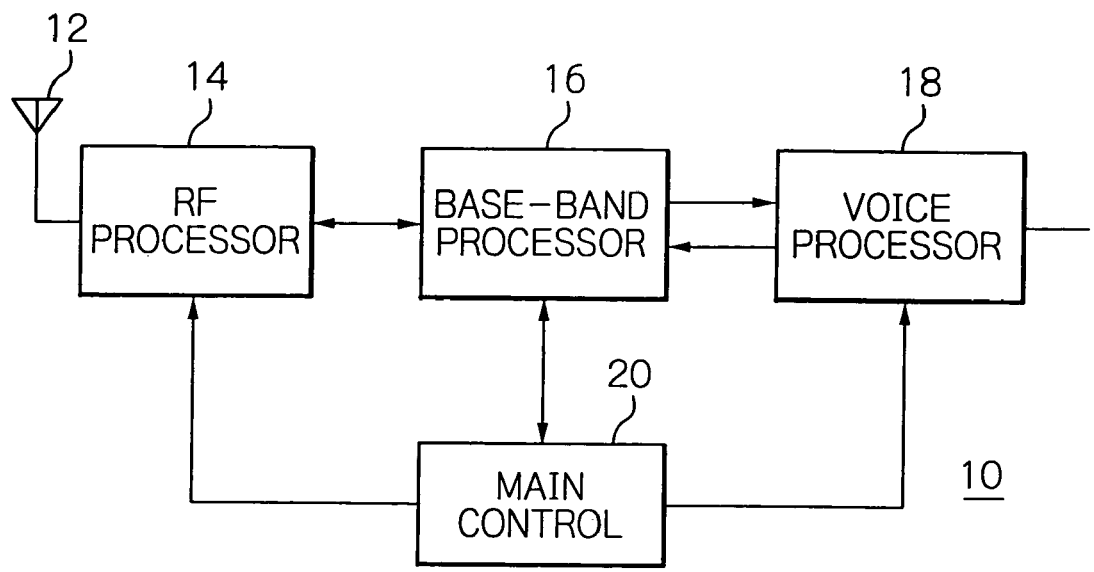
FIG. 2 is a schematic block diagram showing an embodiment of the mobile communications terminal to which the invention is applied.

In the following, preferred embodiments of a mobile communications terminal in accordance with the present invention will be described in detail with reference to the accompanying drawings. With reference to FIG. 2 first, the invention is applied to a mobile communications terminal. The mobile communications terminal 10 of the illustrative embodiment is adapted for communicating by radio with base stations, each of which establishes a small radio zone, referred to as a cell, and has a radio or air interface based upon a W-CDMA as its access scheme.

As shown in the figure, the mobile communications terminal 10 includes an RF processing circuit 14 for transmitting and receiving radio signals through an antenna 12, a base-band processing circuit 16 connected to the RF processing circuit 14 for processing transmitting and received base-band signals, a voice processing circuit 18 connected to the base-band processing circuit 16 for processing voice or speech signals, and a main control circuit 20 for controlling the respective constituent elements of the mobile communications terminal 10, interconnected as illustrated. Parts not directly pertinent to understanding the invention will be omitted from the drawings and description for simplicity.

Figure 3:
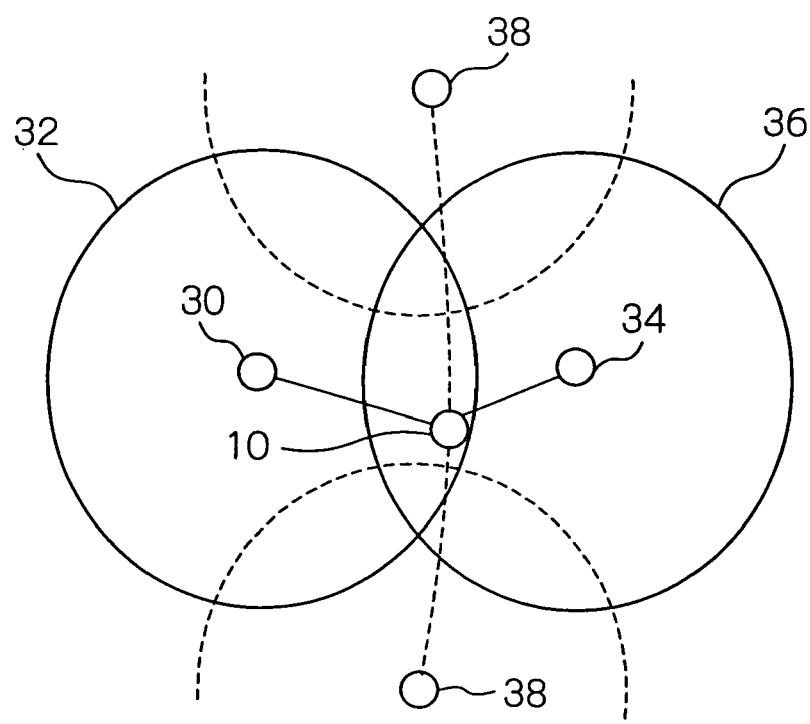
FIG. 3 schematically shows an example of the configuration of cells.

The mobile communications terminal 10 is arranged to be movably carried or traveled in and between cells as understood from an example shown in FIG. 3. The terminal 10 is a mobile station, such as a mobile telephone set, adapted for communicating by radio with base stations establishing respective cells and connectable therewith. In FIG. 3, one of the base stations, e.g. 30, forms a cell 32 having a radio zone shown in the figure, adjacent to which another base station 34 forms a cell 36 having another zone shown in the figure. The base stations 30 and 34 are arranged in such a way that the cells 32 and 36 partially but not entirely overlap with each other. In the example shown in the figure, the mobile communications terminal 10 is possible to selectively establish a radio linkage with either of the base stations 30 and 34 forming the cells 32 and 36, respectively.

The mobile communications terminal 10 has a cell selecting function of receiving radio signals transmitted from the base stations to then select a proper cell according to the state or conditions of the received signals. In the embodiment, an effective cell can be selected with a process determining function in the base-band processor 16 among others of the mobile communications terminal 10.

Figure 1:
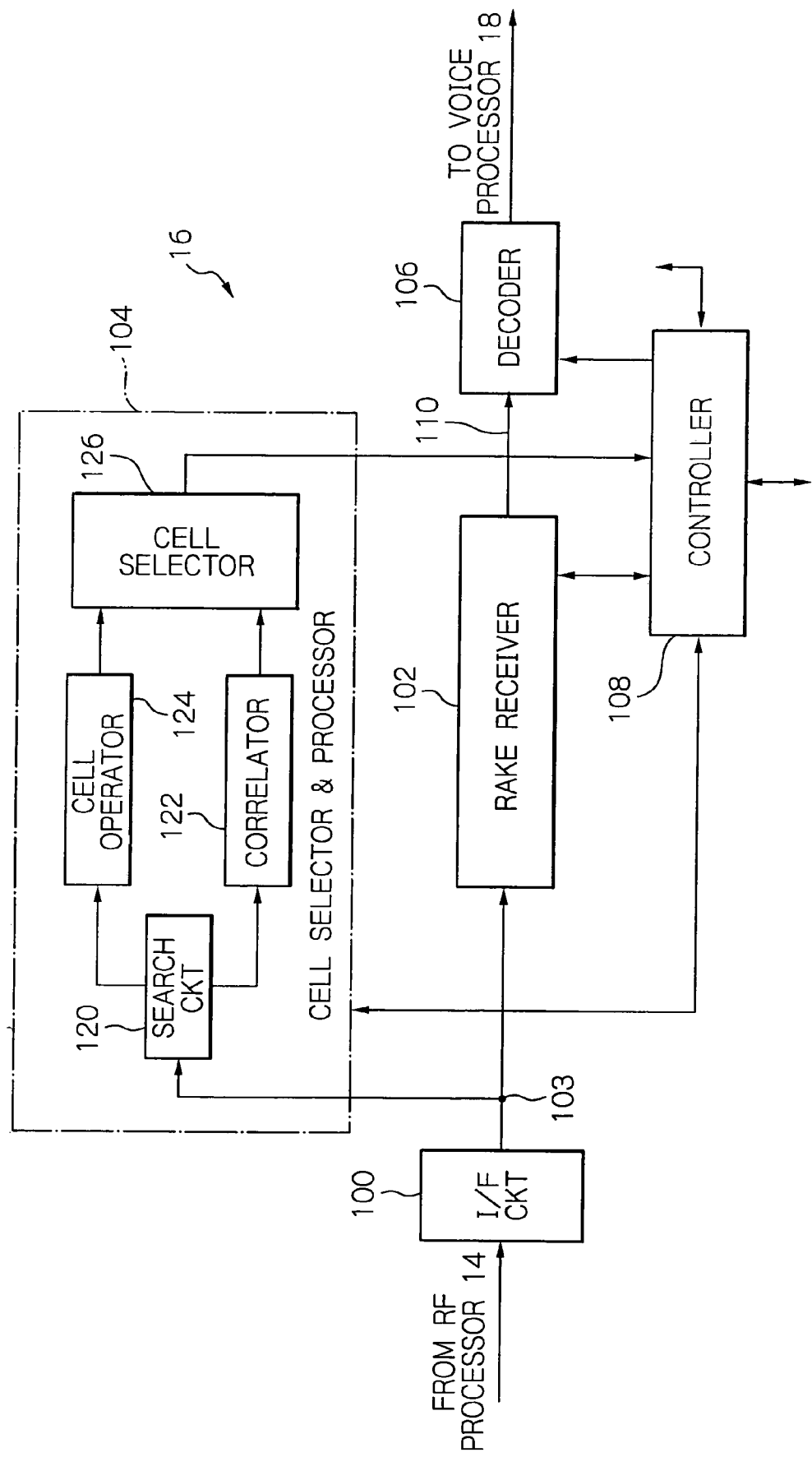
FIG. 1 is a schematic block diagram showing the receiver part of a base-band processor in a mobile communications terminal to which the invention is applied.

The base-band processor 16 for selecting a cell based on the received signals will be described with reference to FIG. 1. The base-band processor 16 includes an interface (I/F) circuit 100 connected to the RF processor 14, a rake receiver 102 and a cell selecting and processing circuit 104 connected in common to the I/F circuit 100 by a connecting line 102, a decoder 106 connected to the output 103 of the rake receiver 102, and a controller 108, interconnected as shown.

The base-band processor 16 is adapted for coding and decoding communication signals. The base-band processor 16 includes transmitter circuitry, not specifically shown in the figure, for spread-spectrum coding a frame signal transmitted from the voice processor 18, FIG. 2, to deliver the resultant signal to the RF processor 14 via the I/F circuit 100 under the control of the controller 108. Further, the base-band processor 16 is provided with receiver circuitry, also not specifically illustrated, for spread-spectrum decoding the received signal transmitted from the RF processor 14 in the rake receiver 102 to extract a frame signal therefrom. The rake receiver 102 has its output 110 connected to a decoder 106. The decoder 106 is adapted to extract a voice frame from the received voice frame signal to deliver the extracted data to the voice processor 18. In the specification, signals are denoted with reference numerals designating connections on which they appear.

The I/F circuit 100 has its output 103 connected to a search circuit 120 in the cell selector and processor 104. The search circuit 120 is provided with a time slot counter, not shown, for counting or defining a specific period of time, or a time slot, to search received signals associated with radio waves received from the base stations forming the respective cells to determine which cell, i.e. base station, the received signal has come from. The search circuit 120 delivers the received signal to a correlator 122 and a cell operating circuit 124.

The correlator 122 is a processing circuit for finding out correlation between the received signals delivered from the search circuit 120 to estimate the electric power of the signals received from the cells, and providing a connecting cell selecting circuit 126 with cell information specifying a cell associated with the received signal having the highest power among them.

The cell operating circuit 124 is a processing circuit for determining by operation, based on the received signals fed from the search circuit 120, the shortest one of the propagation paths associated with the received signals having sufficient electro-magnetic field strength. The cell operator 124 determines as a leading cell a cell in which the path determined to be shortest is established, and feeds the connecting cell selector 126 with the leading cell information for specifying the determined leading cell.

The connecting cell selector 126 is a processor circuit for selecting a connecting cell based on the cell information generated from the correlator 122 and the leading cell information generated from the cell operator 124, and produces selection information selecting an appropriate connecting cell to deliver the latter to the controller 108. The controller 108, upon receiving the information from the cell selector and processor 104, determines based on the selecting information whether or not handover to the connecting cell should be executed, and then notifies the main control 20 of the determined result.

Figure 4:
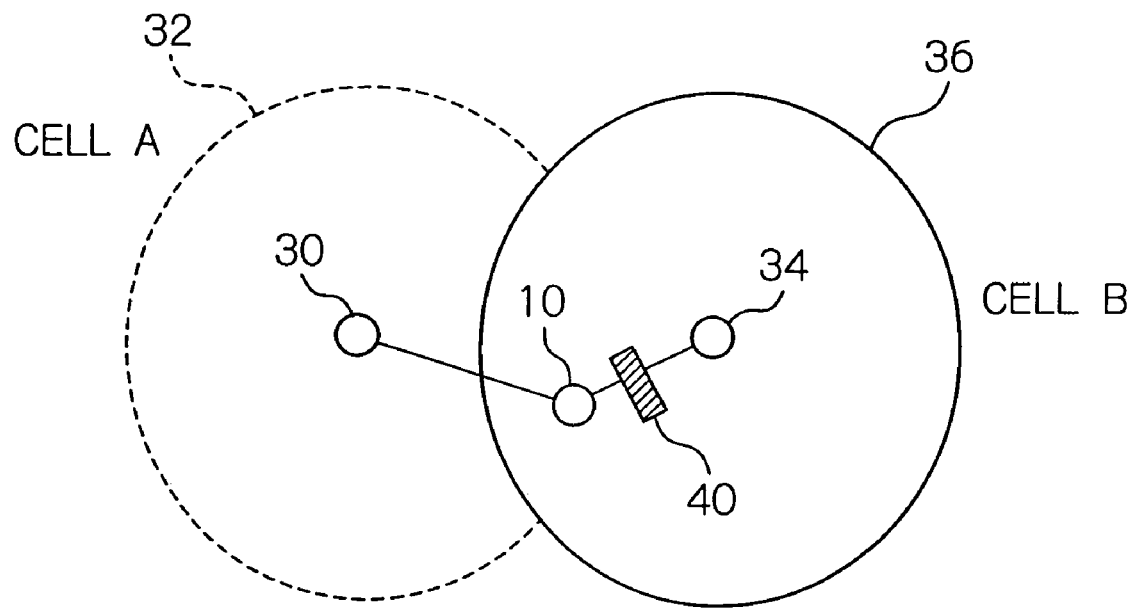
FIG. 4 schematically shows how the signal was received first from one cell in the time slot.

In the following, the processing functions of the search circuit 120, the cell operator 124 and the connecting cell selector 126 will be described in detail among others in the cell selector and processor 104. As shown in FIG. 3, the cells 32 and 36 are formed by the base stations 30 and 34, respectively, and the mobile radio terminal 10 in the cells 32 and 36 sets up a communication link with one base station 34. In the situation, for example as shown in FIG. 4, an obstruction may be interposed between the base station 34 and the mobile station 10 to worsen the condition of the radio wave propagation over the path between the base station 34 and the mobile station 10. The mobile radio terminal 10 in turn searches the received signals by the search circuit 120 to detect the reception timings of the received signals falling in a predetermined period of time L.

Figure 5:
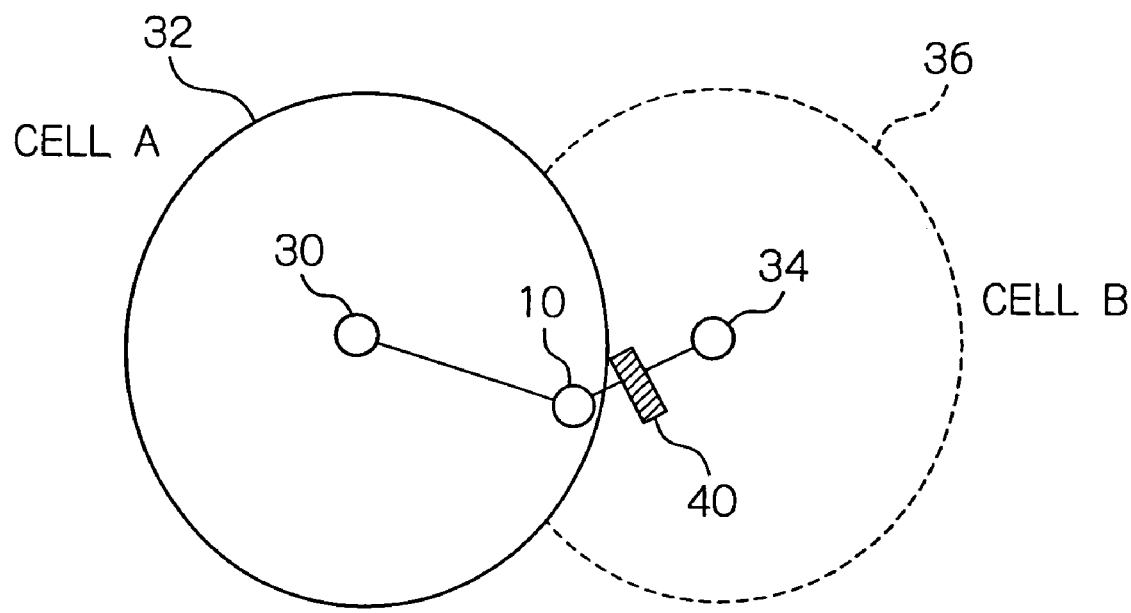
FIG. 5 schematically shows how the signal was received first from the other cell in the time slot.
Figure 6:
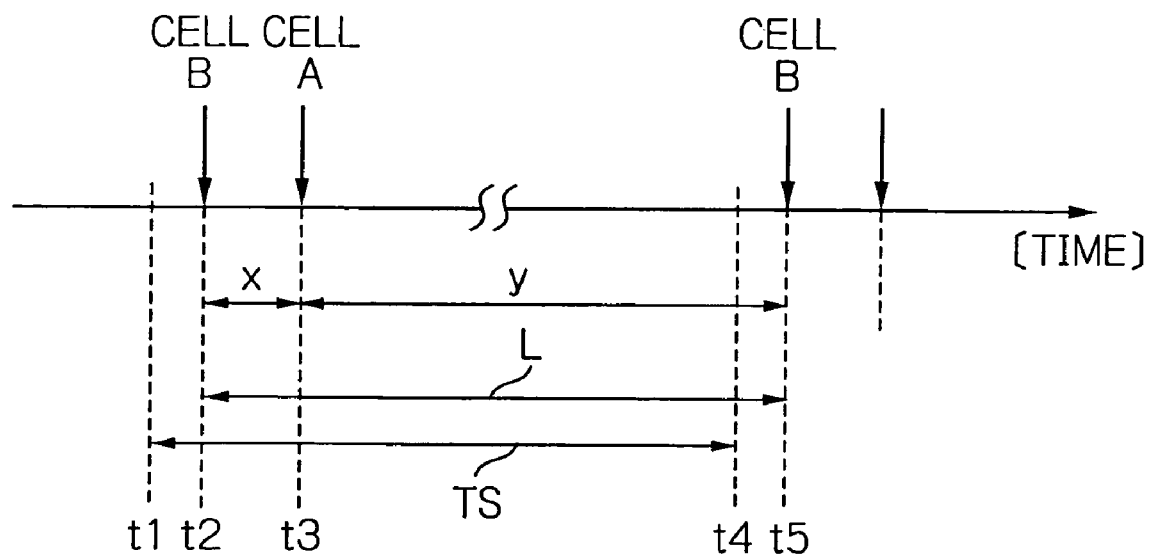
FIG. 6 schematically shows the relationship between the timing of the received signals in cells and the distances x and y.

FIG. 4 shows how the state is determined, with aid of time slot TS, FIG. 6, of timings defined by the search circuit 120, where the signal was received from the cell 36 earlier than from the cell 32 in the time period L corresponding to the time slot TS. FIG. 4 depicts that state with a solid line 36 over a dotted line 32. On the contrary, FIG. 5 shows the state where the signal was received from the cell 32 first in the time period L, with that state depicted with a solid line 32 over a dotted line 36.

Figure 7:
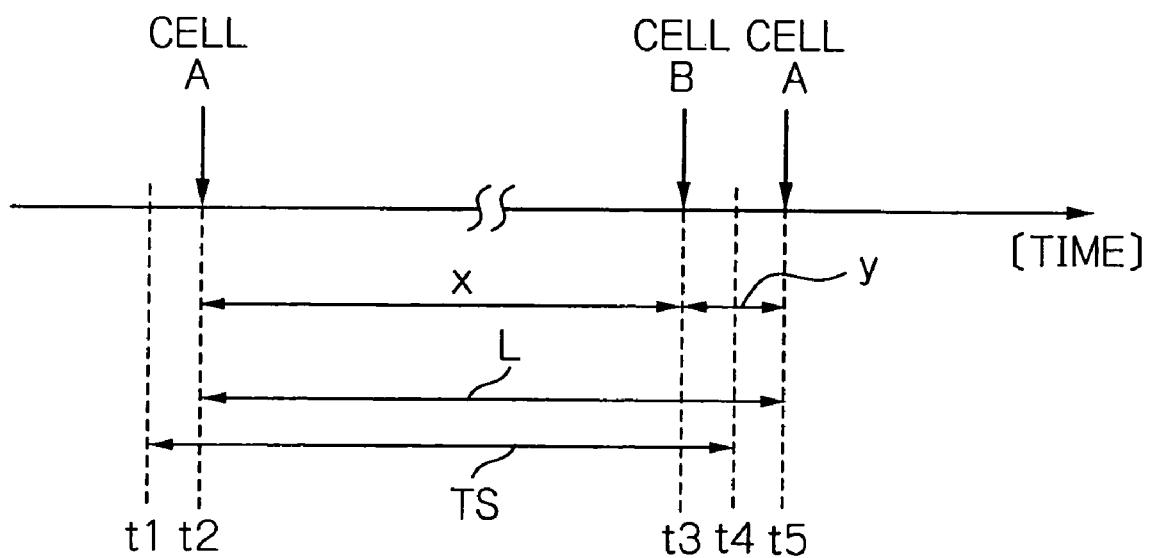
FIG. 7 schematically shows the relationship between the timing of the received signals in cells and the distances x and y.

With reference to FIGS. 6 and 7 showing those timings, the processing function will be further described of selecting a cell having the shortest path. In addition, it is assumed that radio waves received from a base station with its sufficient reception power is not subject to a delay in propagation larger than the time period L.

The example shown in FIG. 6 is the state where the time slot TS is initiated at timing t1, the signal received from the cell 36 is detected at the next timing t2, and the signal received from the cell 32 is detected at timing t3, which is behind by a period of time x. Subsequently, at timing t4, the time slot is terminated, and at the same time a new time slot is initiated following the former. At timing t5, the signal received from the other cell 36 will be detected. Those reception timings of received signals are determined according to the digital values included in the time slot counter, stated earlier but not shown, in the search circuit 120.

Under the condition described above, the cell operator 124 temporarily defines the cell 36 earlier detected in the time slot as the earliest coming one, and calculates the distance x between the cells 36 and 32 as a difference in reception timing of the received signals according to the following expression (1):

$$x = |Cell_B - Cell_A|, \quad (1)$$

where $Cell_B$ and $Cell_A$ represent the timing of the cells 36 and 32, respectively.

Then, with respect to the cell B or 36 temporarily defined as the earliest coming one, the distance y is calculated as a difference in reception timing of the received signals with the timing delayed by the specified period of time [L] corresponding to the length L of the time slot, according to the following expression (2):

$$y = |Cell_B + [L] - Cell_A|. \quad (2)$$

Then, the results x and y obtained from the expressions (1) and (2) are compared in value with each other. In this instance, x is determined as smaller than y, and therefore, the expression (1) is employed from which the smaller value has been obtained. More specifically, as shown in FIG. 6, the previously defined cell 36 or B that has arrived first in the interval corresponding to the distance x is determined as a leading cell.

Another example shown in FIG. 7 is the state where the time slot TS is initiated at timing t1, the received signals from the cells A and B are detected at times t2 and t3, respectively, where the time t2 precedes to the time t3 by a difference x. Subsequently, at time t4, the time slot is terminated, and at the same time the following time slot is initiated. At time t5, the received signal from the cell 32 or A is detected.

In this way, the counter for counting the time slots acts asynchronously with the received signals so that the signals are received at various timings with respect to the time slots. Therefore, the path associated with a cell detected first in a time slot may not always be shorter than those detected later. Even in such a case, the cell operator 124 temporarily defines the cell A, first detected with respect to the time slot as the earliest coming one in the instance, and calculates the distance x from that cell A to the cell B according to the following expression (3):

$$x = |Cell_A - Cell_B|. \quad (3)$$

Subsequently, in respect of the cell A defined as the earliest coming one, the distance y is calculated with the timing delayed by the specified period of time [L] corresponding to the length L of the time slot, according to the following expression (4):

$$y = |Cell_A + [L] - Cell_B|. \quad (4)$$

Then, when the results x and y from the expressions (3) and (4) are compared in value with each other, y is determined as smaller than x in this case. The expression (4) from which the smaller value y has been obtained will thus be employed. Specifically, as shown in FIG. 7, the other cell B, rather than the previously defined cell A, is determined to be a leading cell.

After a cell associated with a shorter path to be selected is thus determined according to the timing of the received signals, a correlation value is measured on the received signals from the selected cell to determine whether or not the reception level is substantially equal to or exceeds a predetermined threshold satisfying the reception quality. When the level is determined as equal to or exceeds the threshold, corresponding to an acceptable reception quality, the connecting cell selector 126 transmits to the controller 108 the selection information representative of the selection of the cell determined to be a leading cell as a connecting cell. The controller 108 determines whether or not the cell represented by the selection information is the cell in which the communication channel is currently established, and thus controls communication with the base station forming the cell designated by the selection information.

The control stated above prevents handover from being taken place, which would otherwise be carried out when an obstruction exists on the radio wave propagation path to temporarily lower the reception level of the signals received by the mobile communications terminal 10 within a range where signal transmission is possible to select a cell formed by another base station from which the terminal 10 received signals in temporarily higher level than the cell presently selected.

In an application, for example, in which, between cells formed by the base stations the signals transmitted from the base stations are not synchronous, i.e. the cells are not synchronized with each other, the system may for example be adapted to utilize a broadcast channel over which signals are continuously transmitted from the base stations to estimate the time offset Δt (delta t) to correct the reception timing of the received signals based on the estimated time offset Δt.

Figure 8:
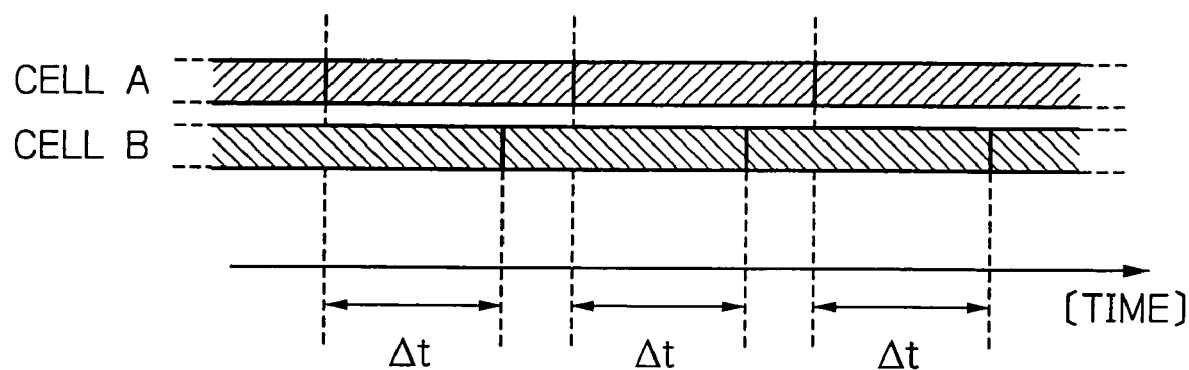
FIG. 8 schematically shows time offset between cells.

For example, as shown in FIG. 8, assuming that the time offset of the cell B is Δt with respect to the reception timing of the signal received from the cell A, the cell operator 124 may be adapted to add a correcting value corresponding to the offset to the reception timing of the cell B, and in turn to apply the reception timing thus corrected to the foregoing expressions (1) and (2), and (3) and (4).

The entire disclosure of Japanese patent application No. 2004-22720 filed on Jan. 30, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of selecting a cell formed by a base station to which a mobile station is to be connected, comprising the steps of:
   preparing a mobile communications system having a plurality of cells formed by a corresponding plurality of base stations and a mobile station travelable in a radio service area covered by the plurality of cells to communicate by radio with one of the plurality of base stations;
   detecting a first reception timing of a signal received from a first one of the plurality of cells by the mobile station and a second reception timing of a signal received a from second one of the plurality of cells by the mobile station;
   calculating a first absolute value of a difference between the first reception timing and the second reception timing, and a second absolute value obtained by subtracting the second reception timing from the first reception timing plus a period of time corresponding to a length of a time slot;
   determining a cell from which the signal was received and with which a shorter propagation path is associated, based on a magnitude relation between the first absolute value and the second absolute value calculated; and
   selecting the determined cell as the cell to which the mobile station is to be connected.

2. The method in accordance with claim 1, further comprising the step of connecting by radio the mobile station to the base station forming the selected cell.

3. The method in accordance with claim 1, wherein, when the mobile station is located commonly in at least two of the plurality of cells, a cell is selected which is associated with a shorter propagation path of the received signal than a cell associated with the received signal having a higher reception power.

4. The method in accordance with claim 1, wherein the signals transmitted from the base stations in the first and second cells are not synchronous with each other, said method further comprising the steps of:
   estimating, when synchronization is not established between the first and second cells, a time offset between the first and second cells;
   correcting the first and second reception timings of the received signals based on the estimated time offset; and
   using the corrected reception timings to calculate the first and second absolute values.

5. A mobile communications terminal travelable in a radio service area covered by a plurality of cells formed by a corresponding plurality of base stations for selecting one of the plurality of cells which is formed by a base station to be connected, comprising:
   a transmitter/receiver for transmitting and receiving a radio signal to and from any of the plurality of base stations; and
   a base-band processor for spread-spectrum coding frame signal to be transmitted to deliver the coded frame signal to said transmitter/receiver, and spread-spectrum decoding the signal received by said transmitter/receiver to then extract the frame signal,
   said base-band processor comprising:
   a signal receiver for demodulating the received signal; and
   a cell selecting and processing circuit for selecting a cell to be connected on a basis of a propagation path associated with the received signal and an electric power of the received signal,
   said cell selecting and processing circuit comprising:
   a detector for generating a time slot to detect a reception timing of the received signal, and for detecting a first reception timing of a signal transmitted from a first one of the plurality of cells and a second reception timing of a signal transmitted from a second one of the plurality of cells;
   a cell operator for calculating a first absolute value of a difference between the first reception timing and the second reception timing, and a second absolute value obtained by subtracting the second reception timing from the first reception timing plus a period of time corresponding to a length of the time slot to determine a cell from which the signal was received and which is associated with a shorter propagation path, based on the magnitude relation between the first absolute value and the second absolute value; and
   a correlator for determining correlation of the received signals to calculate the electric power of the received signal.

6. The terminal in accordance with claim 5, wherein the signals transmitted from the base stations in the first and second cells are not synchronous with each other,
   said cell operator estimating, when synchronization is not established between the first and second cells, a time offset between the first and second cells, correcting the first and second reception timings of the received signals based on the estimated time offset, and using the corrected reception timings to calculate the first and second absolute values.

* * * * *